J. W. CRUIKSHANK.
GLASS TEEMING APPARATUS.
APPLICATION FILED SEPT. 27, 1909.

985,783.

Patented Mar. 7, 1911.

6 SHEETS—SHEET 1.

WITNESSES:
R A Balderson
Walter Famariss

INVENTOR.
J. W. Cruikshank.
by Bakewell, Byrnes & Parmelee,
ATTORNEYS.

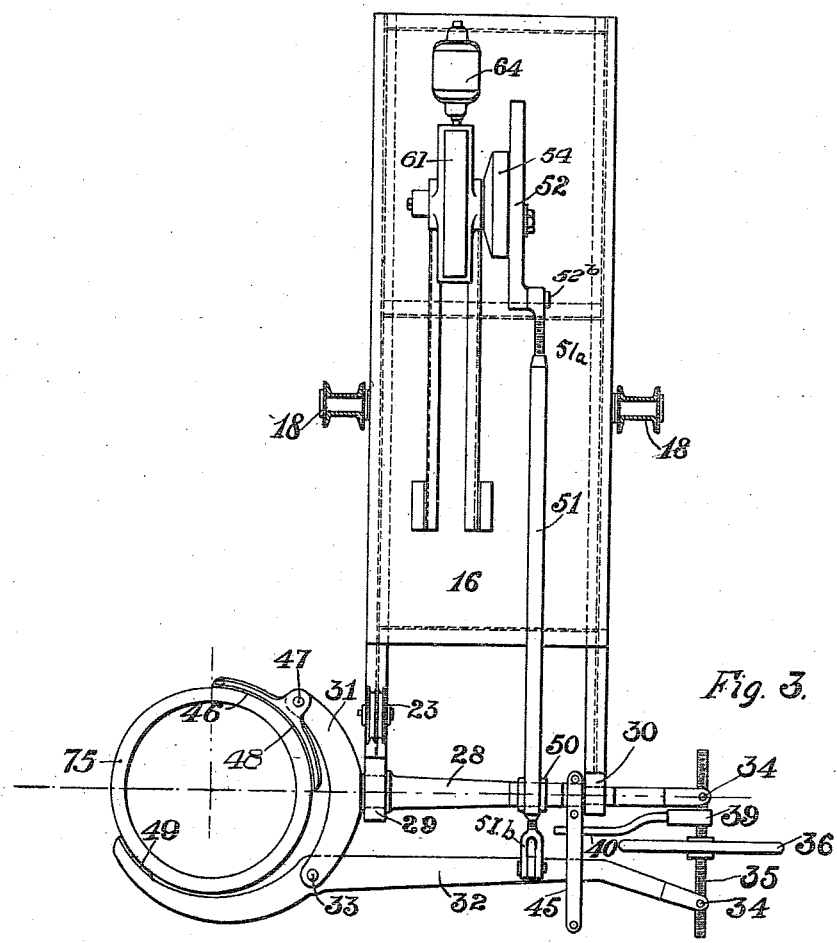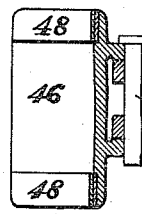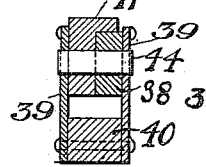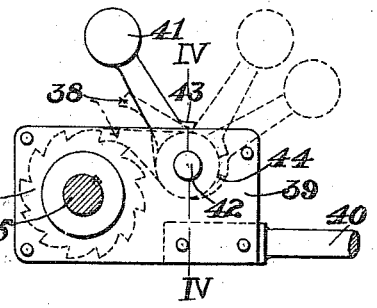

J. W. CRUIKSHANK.
GLASS TEEMING APPARATUS.
APPLICATION FILED SEPT. 27, 1909.
985,783.
Patented Mar. 7, 1911.
6 SHEETS—SHEET 4.
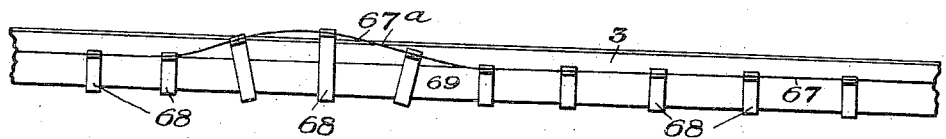
Fig. 7.
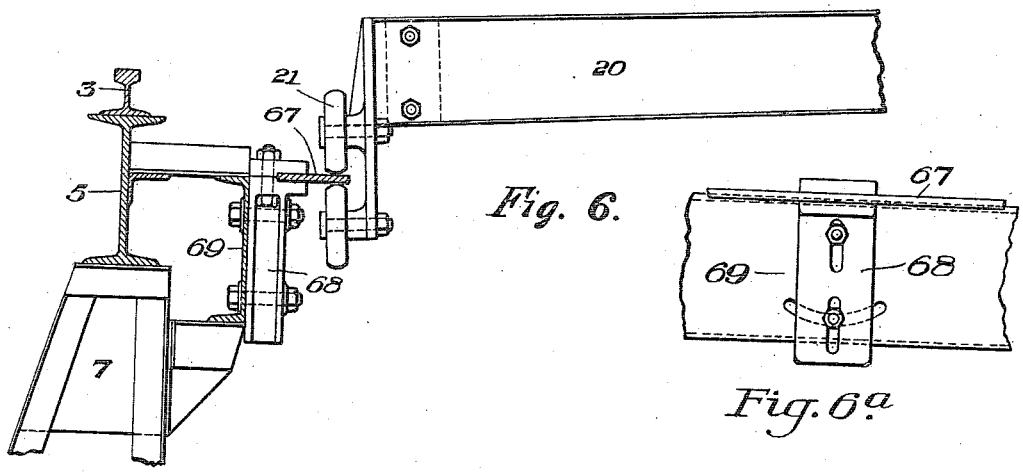
Fig. 6.
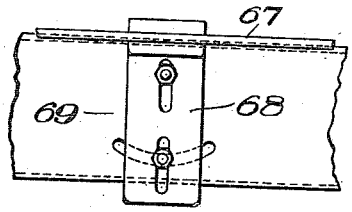
Fig. 6ª.
WITNESSES:
R A Balderson
Walter Famaries
INVENTOR.
J. W. Cruikshank,
by Bakewell, Byrnes & Parmelee,
ATTORNEYS.

J. W. CRUIKSHANK.
GLASS TEEMING APPARATUS.
APPLICATION FILED SEPT. 27, 1909.
985,783.
Patented Mar. 7, 1911.
6 SHEETS—SHEET 5.
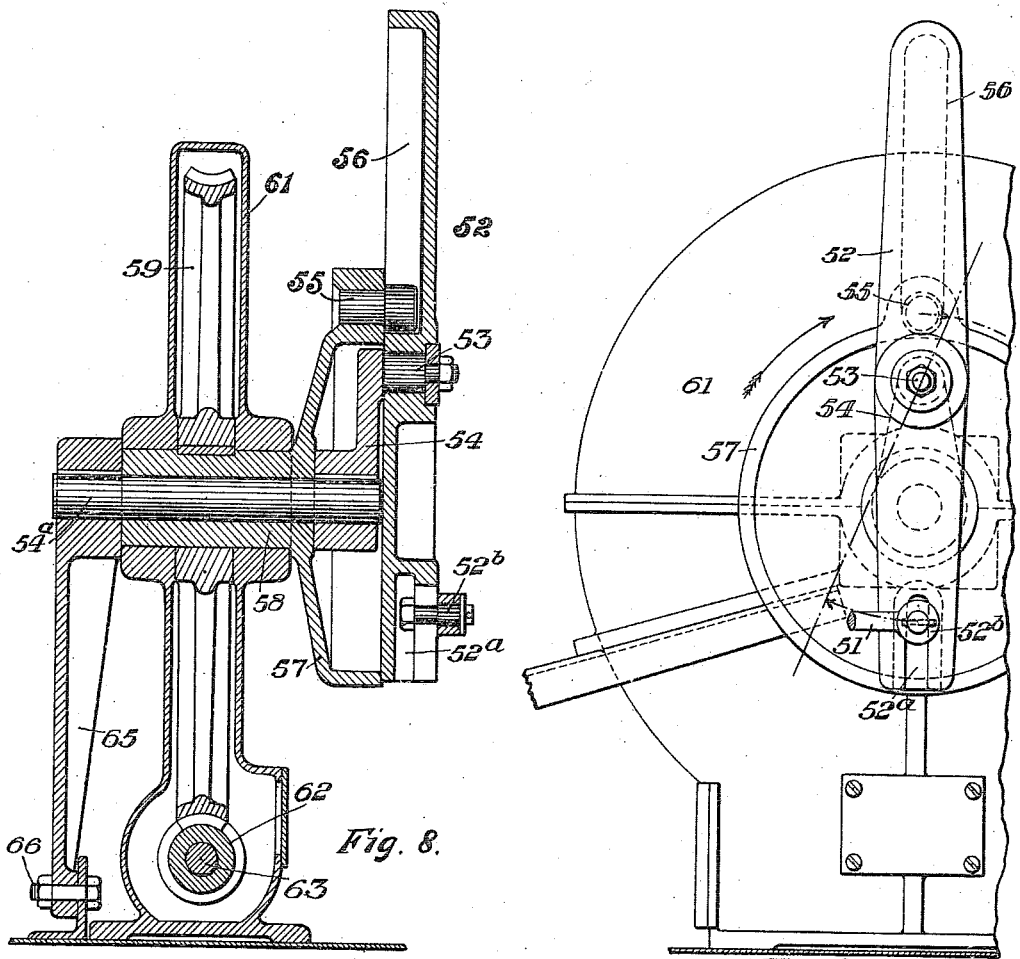
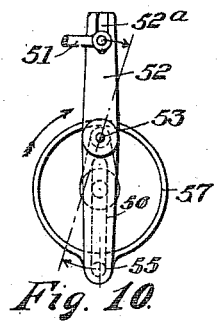
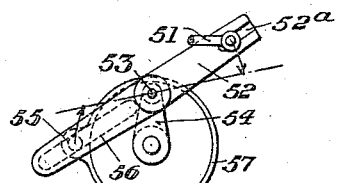
WITNESSES:
INVENTOR.
J. W. Cruikshank.
by Bakewell, Byrnes & Parmelee.
ATTORNEYS.

J. W. CRUIKSHANK.
GLASS TEEMING APPARATUS.
APPLICATION FILED SEPT. 27, 1909.
985,783.
Patented Mar. 7, 1911.
6 SHEETS—SHEET 6.
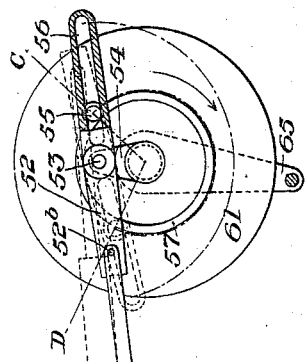
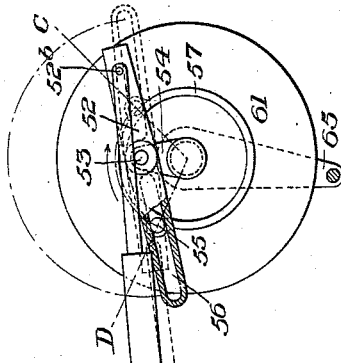
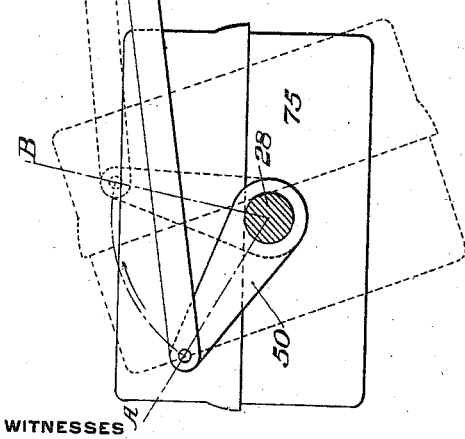
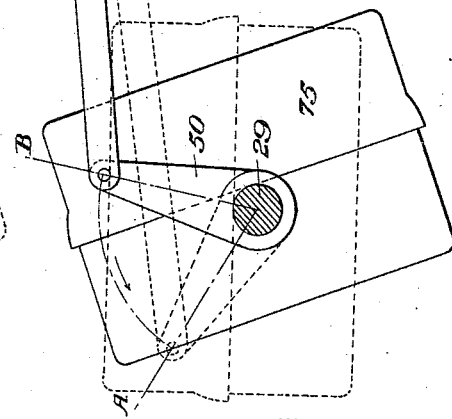
WITNESSES
R. A. Balderson
Walter Tamariss
INVENTOR
J. W. Cruikshank
by Bakewell, Byrnes Parmelee,
Attorneys.

UNITED STATES PATENT OFFICE.

JAMES W. CRUIKSHANK, OF PITTSBURG, PENNSYLVANIA.

GLASS-TEEMING APPARATUS.

985,783.                Specification of Letters Patent.       Patented Mar. 7, 1911.

Application filed September 27, 1909. Serial No. 519,766.

*To all whom it may concern:*

Be it known that I, JAMES W. CRUIKSHANK, of Pittsburg, in the county of Allegheny and State of Pennsylvania, have invented a new and useful Improvement in Glass-Teeming Apparatus, of which the following is a full, clear, and exact description, reference being had to the accompanying drawings, forming part of this specification, in which—

Figure 1:
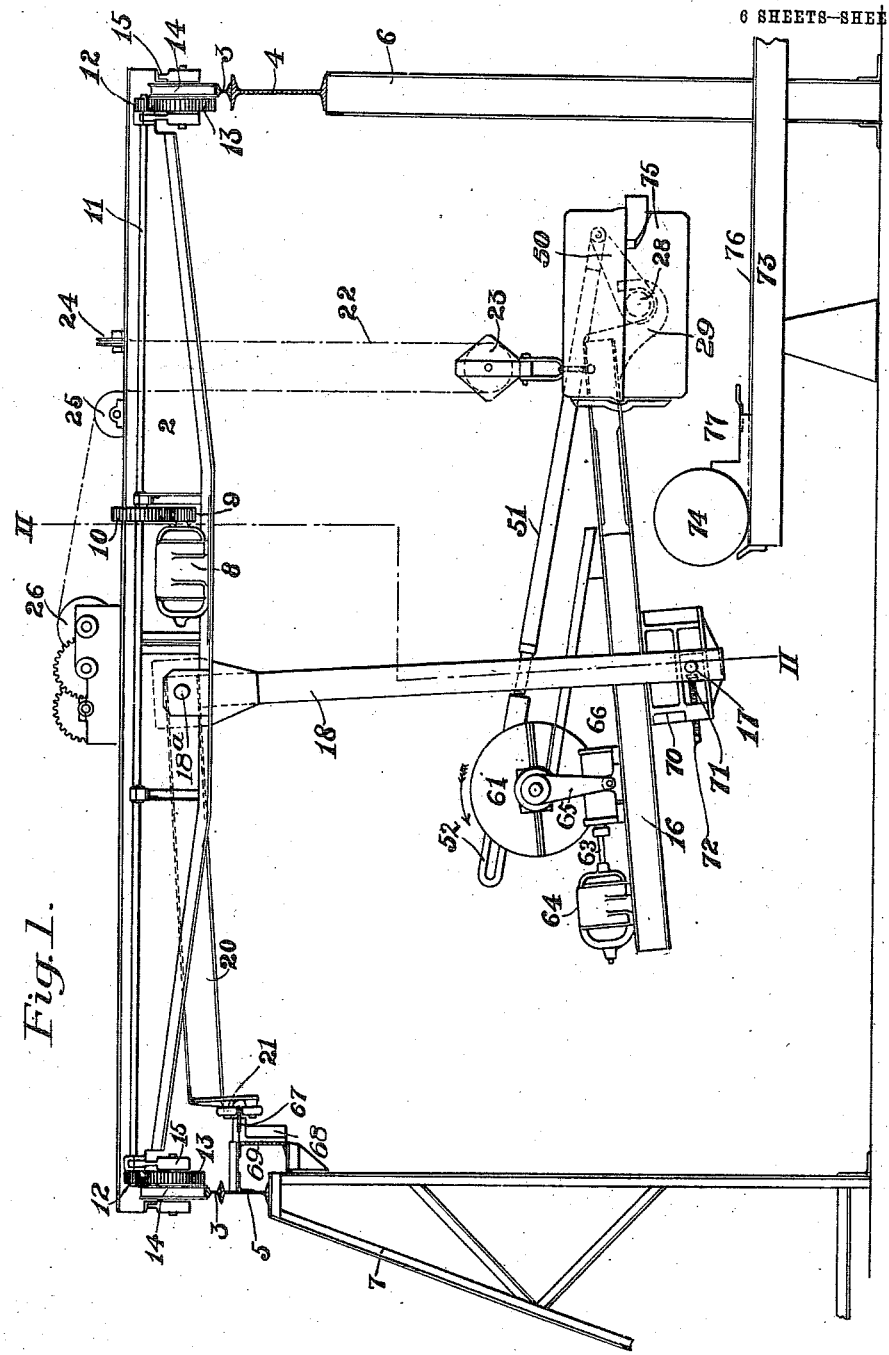
Figure 2:
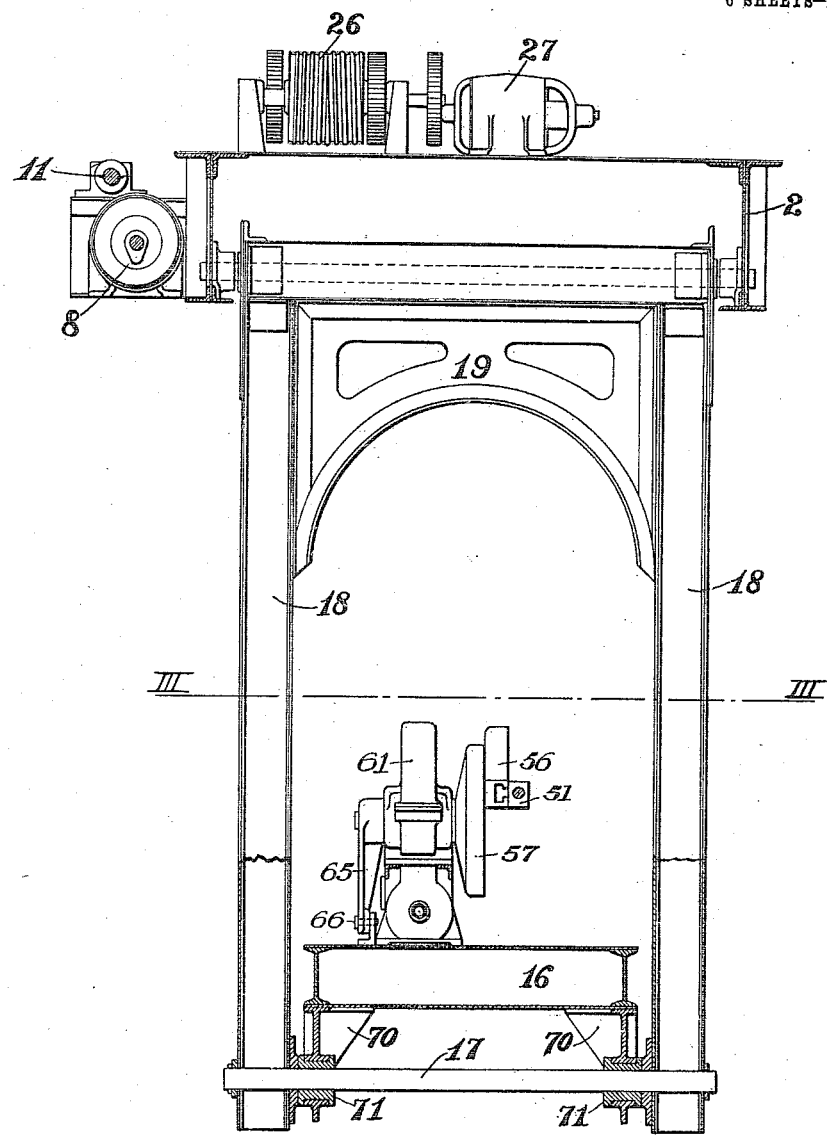

Figure 1 is a side elevation of one form of my improved apparatus, partially diagrammatic and showing the apparatus in position above the table for rolling plate glass. Fig. 2 is a sectional view on the line II—II of Fig. 1. Fig. 3 is a plan view of part of the apparatus below the line III—III of Fig. 2. Fig. 4 is a detail view partially in section of the mechanism for locking the screw shaft for closing the tongs. Fig. 4$^a$ is a detail section on the line IV—IV of Fig. 4. Fig. 5 is a detail sectional view of a portion of one of the jaws of the tongs. Fig. 6 is a detail view of a portion of the track. Fig. 6$^a$ is a side elevation of a portion of the track shown in Fig. 6. Fig. 7 is a longitudinal elevation of the auxiliary track for swinging the tongs carrier. Fig. 8 is a sectional view of the worm wheel and operating mechanism for tilting the pot. Fig. 9 is a side elevation of the same. Figs. 10 and 11 are diagrammatic details showing the different positions of the tilting mechanism shown in Figs. 8 and 9. Fig. 12 is a diagram illustrating the movement of the tilting operating mechanism when moving to tilt the pot forward for pouring the contents on the table. And Fig. 13 is a similar view showing the return movement of the pot and its tilting mechanism.

My invention relates to apparatus for teeming or casting glass from pots upon the table on which glass is to be rolled into sheets or plates.

The particular object of my invention is to provide means for turning the pot at a slow speed during its forward movement while pouring the glass on the table, and quickly returning the pot to its upright position to prevent loss of molten glass on the floor after the pot has passed beyond the table.

A further and more particular object is to provide adjustable means for the proper distribution of glass on the table, whereby the pot is bodily moved in a longitudinal direction with relation to the table, during its transverse movement across said table, so as to properly distribute the glass on the table, to overcome a waste of glass caused by the non-filling of one corner of the table.

Another object of my invention is to provide a gripping device on the tongs which will adjust itself to the irregularities of a clay pot, so as to avoid the necessity of an excessive pressure on the pot by the jaws of the tongs. Heretofore the pot was gripped by two rigid members, which not only tend to chip out the clay pot at their points of contact, but have a tendency, to slip during the tilting and consequent change in the center of gravity of the pot. I overcome this defect by providing one of the jaw members with a swiveled member having two contacting points which grasp the pot at the opposite side from the point contacted by the fixed member thereof; by this means I provide a three-point contact between the jaws of the tongs and the pot, two of which are adjustable, which allows them to freely grasp the pot irrespective of the irregularities in the wall thereof.

The precise nature of my invention will be best understood by reference to the accompanying drawings, which will now be described, it being premised, however, that various changes may be made in the details of construction and general arrangement of the various parts, without departing from the spirit and scope of my invention as defined in the appended claims.

In the drawings, the numeral 2 designates a traveling crane, which is movable upon a track 3, mounted on a runway consisting of beams 4 and 5 which are secured to suitable supporting columns 6 and 7.

8 is a motor supported on the crane 2, and is connected by means of gears with a shaft 11. 12 are pinions secured to this shaft which mesh with gears 13 which are attached to the driving wheels 14 of the crane. These wheels 14 are mounted in the usual trucks provided with bearings 15.

16 designates a tipping frame pivotally mounted on a shaft 17 carried by arms 18, of a second swinging frame pivoted at 18$^a$ to the girders of the crane. These arms 18 are braced by the curved iron work 19, the precise construction of which is immaterial providing it is of proper and sufficient strength to support the operating parts hereinafter described. Secured to the under side of the beams of the frame 16 are brackets 70 slidably mounted on blocks 71 on the shaft 17.

72 are screws, the heads of each of these screws are rotatably mounted in one of the blocks 71, and extend through a threaded orifice in one of the brackets 70. By rotating the screws, the position of the tilting frame can be adjusted with relation to the longitudinal movement of the casting table.

If the pot is too close to the roll while pouring or teeming the glass on the table, the molten glass will splash on the roller and cause bubbles or defects on the sheet of glass, and if too far away from the roller, the table will not be filled, which will cause a loss in footage in the size of the plate. By means of the foregoing described adjustment the required distance of the pot from the roll may be readily adjusted.

Rigidly connected to the arms of the swinging frame is an extension 20, consisting of suitable beams provided with rollers 21 at the ends. These rollers 21 are mounted so as to engage both sides of a track 67, mounted on brackets 68 which are adjustably secured to the channel beams 69, of the crane runway. This track is straight throughout the major portion of its length, but is provided with a curved portion indicated as 67ª at a point above the casting table. This track 67 is clamped between jaws of adjustable brackets 68 which are adjustably secured to the channel beam 69, and by adjusting these brackets the curvature in the track 67 may readily be varied to pour the glass on the proper line.

The tipping frame 16 is suspended near its outer end by a rope or cable 22, which passes around a pulley 23 connected to the tipping frame by means of a shackle. One end of the cable passes over an equalizing sheave 24 and the other end passes over a sheave 25, thence to a winding drum 26 of a hoist operated by an electric motor 27.

The outer end of the tipping frame 16 is provided with bearings 29 and 30, and mounted in these bearings is a shaft 28, which forms one of the reins of the tongs and 32 is the other rein thereof and are pivoted to each other at 33. The opposite ends or reins 28 and 32 of the tongs are provided with trunnion nuts 34, provided respectively with right and left hand threads to engage a screw shaft 35, which is provided with an operating hand wheel 36.

37 is a ratchet wheel keyed to the screw shaft 35.

38 is a pawl which is pivotally mounted on a pin 42 between plates 39, forming a box to which an arm 40 is rigidly connected, and pivotally mounted on the pin 42 is a weighted arm 41 which lies between the plates 39 and adjacent to the pawl. This arm 41 is provided with a projection 43 adapted to engage a corresponding projection 44 on the pawl.

45 is a guide which is rigidly connected to the shaft or rein 28 of the tongs and is adapted to receive the rein 32 and the arm 40, to guide and support them in proper relation with each other and their operating mechanism.

46 is a segmental jaw member pivotally mounted on the other end of the T-head 31 by means of the pin 47. 48 are metal strips secured thereto and are adapted to contact with the pot.

49 is a shoe on the other jaw member of the tongs, and is formed integrally with the rein 32.

Mounted on the tipping frame 16 is a casing or frame 61 and journaled in this frame is a sleeve 58. Keyed to this sleeve 58 and within the casing 61 is a worm wheel 59 which meshes with a worm wheel 62, secured to a shaft 63, which is also rotatably mounted in the casing 61. Mounted on the frame 61 is a motor 64 which is connected to the shaft 63.

Rigidly secured to the casing 61, by a bolt 66 is one end of an arm 65, and secured in the other end of this arm is a rod 54ª which extends through the bore of a sleeve 58.

54 is a crank arm which is keyed to the other end of the rod 54ª, and is provided with a pin 53 at the end thereof. Rotatably mounted on this pin is an arm 52, one end of which is provided with a radial slot 56, and the other end thereof is provided with a fork 52ª adapted to receive an adjustable stud 52ᵇ.

Formed integrally with the sleeve 58 is a disk 57 having a pin 55 extending into the radial slot 56 in the arm 52, for the purpose hereinafter described.

51 is a link, one end of which is provided with an adjustable screw 51ª, having a head which is journaled on a pin 52ᵇ. The other end thereof is provided with an adjustable clevis 51ᵇ pivoted to the end of an operating lever extending from the shaft or rein 28 of the tongs.

73 designates the casting table, 74 the roller, and 75 the pot containing the molten glass.

76 are strips on each edge of the table technically known as trangs, which form a support for the roller in its movement across the table; the thickness of these trangs regulates the thickness of the glass plate.

77 is the usual form of gun, one of these guns being placed on each side of the table and slides on the trang on that side, and is pushed by the roller 74. These guns act as guards to keep the batch of fluid glass on the table.

The operation of the device is as follows: A pot filled with molten glass is placed on a suitable pedestal on the floor and a crane is moved on its track until the jaws of the tongs are brought into position above the pot. The frame 16 is then lowered by means of the motor 27 until the jaws of the tongs are lowered below the ridge on the pot. The tongs are then closed to grip the pot and the motor 27 is reversed to raise the pot from the pedestal and to the proper height above the table 73. The crane is now moved upon the track to a position over the casting table to pour or teem the glass thereon. The pot is now moved across the table and the operator sets the motor 64 into motion, and through the medium of the tilting mechanism the pot is tilted so that the contents are poured on the table during the movement of the crane across said table to distribute the glass thereon. During the movement of the pot across the table, it is advanced toward the roller by means of the engagement of the rollers 21 with a curved portion 67$^a$ of the track 67, which in turn tilts the frame 16 and 18 on the pivots 18$^a$, to pour glass in a predetermined line with the roller 74, so as to form a sheet of glass whose end is straight and approximately at right angles to the side edges. This advancing of the pot during its tilting movement overcomes the receding of the lip thereof away from the roll, which receding is due to the rotation of the pot on the axis of rotation of the tongs. The pot is tilted by means of the following mechanism: The disk 57 is rotated through the medium of the worm and worm wheel connections with the motor 64, and the pin 55 through its connections with the lever 52 will rotate it about the pin 53, which will tilt the pot on the axis of the rein of the tongs 28, by means of the link 51 connected to the arm 52 and the operating lever 28 thereon.

In Fig. 12 I have shown diagrammatically the movement of the pot and its various operating connections during the forward or pouring movement. After the pot has been moved over the table to pour the glass thereon, the various parts are all in the position shown in full lines in Fig. 12. The motor 64 is started which rotates the worm wheel 59 and with it the disk 57. The disk 57 will rotate the pin 59 around the rod 54$^a$ in the direction of the arrow, which will in turn rotate the lever 54 around the pin 53 in the direction of the arrow, which will rotate the pin 52$^b$ concentrically around the pin 53 and eccentrically around the rod 54$^a$. This combined concentric and eccentric movement will tilt the pot to pour the contents thereof on the table and return it to its upright position. The eccentric movement of the pin 55, with relation to the lever 52, is so arranged that the pot will be slowly tilted to pour the glass on the table, and after the glass has been poured, the pot will be quickly returned to its vertical position. In other words, the pot will be moved forwardly from A to B while the pin 55 is rotated from C to D or about 270°, and the pot will be returned from B to A or to its upright position while the pin 53 moves from D to C or about 90° of its full movement.

The advantages of my invention result from the provision of means for supporting a pot for teeming glass which is supported on a swinging frame mounted on an overhead traveling crane. Further in the provision of an auxiliary track which may readily be adjusted to swing the frame to move the pot longitudinally of the table during its transverse movement across said table. Also in the provision of means for comparatively slowly tilting the pot while teeming and quickly returning it to its upright position after the pot has passed beyond the edge of the table, and thereby avoid a loss of molten glass.

Still another advantage results from the provision of tongs having a swiveled jaw member arranged to form a three-point contact with the pot, and which will readily adapt itself to the irregularities thereof, so as to firmly grasp the pot without applying undue pressure on its walls, and thus avoid all danger of chipping it by the pressure of the tongs. Further in the provision of pot contacting portions on one of the tongs members in different horizontal planes from the contacting portion of the other member, and so arranging the last mentioned member that the pot can be dumped in close relation to the gun without contacting therewith.

Still another advantage results from the provision of a pawl for engaging the ratchet wheel on the screw shaft for closing the reins of the tongs, which is provided with a weighted lever movably arranged therewith, so that the weight can be applied to throw the pawl into engagement with the ratchet when the screw shaft is rotated to close the tongs, which can be shifted so as to disengage the pawl from the ratchet when the screw shaft is rotated to release the tongs from the pot.

Another important advantage results from the provision of rotary means for automatically tilting the pot forwardly and backwardly a predetermined distance for each rotation and thereby avoid all danger of jarring the mechanism by moving parts striking stationary portions of the crane, which jarring would tend to break the various parts, and might also dislodge dirt and allow it to drop on the casting table and damage the sheet.

I claim:

1. In glass teeming apparatus, a table for receiving the molten glass, a carriage transversely movable with relation to the table, a swinging frame supported on the carriage, and means to swing the frame by the movement of the carriage; substantially as described.

2. In glass teeming apparatus, a table for receiving the molten glass, a carriage transversely movable with relation to the table, a swinging frame supported on the carriage, a pot for containing the molten glass, means on the swinging frame for supporting the pot, and means to swing the frame and pot by the movement of the carriage; substantially as described.

3. In glass teeming apparatus, a table for receiving molten glass, a carriage transversely movable with relation to the table, a swinging frame supported on the carriage, and an auxiliary track for swinging the frame; substantially as described.

4. In glass teeming apparatus, a table for receiving the molten glass, a crane transversely movable with relation to the table, a swinging frame pivotally mounted on the crane, and an adjustable track for swinging the frame; substantially as described.

5. In glass teeming apparatus, a table for receiving molten glass, a carriage transversely movable with relation to the table, a swinging frame supported on the carriage, a pair of tongs supported on the frame for holding a glass pot, and means to swing the tongs by the movement of the crane; substantially as described.

6. In glass teeming apparatus, a movable carriage, a pair of tongs having jaws and reins mounted on said carriage, a reversely screw threaded shaft connecting the ends of the reins to open and close the jaws, a ratchet wheel on said shaft, a pawl for engaging the said ratchet wheel, and a shifting weight to throw the pawl into and out of engagement with the ratchet wheel; substantially as described.

7. A glass teeming apparatus having a table, a pair of tongs, a glass pot supported by said tongs and arranged to be moved across the table, and means connected to the tongs to tilt the pot forward and backward at differential speeds by a continuous and uniform movement of the tilting means, the arrangement being such that the pot is tilted slowly while teeming and quickly reversed when the pot reaches the edge of the table; substantially as described.

8. Glass teeming apparatus having a table, a pair of tongs, a glass pot supported by said tongs and arranged to be moved across the table, a rotary lever connected to the tongs to tilt the pot, and means to rotate the lever through a complete cycle at a uniform speed to tilt the pot forward and backward at differential speeds, the arrangement being such that the pot is tilted slowly while teeming and quickly reversed when the pot reaches the edge of the table; substantially as described.

9. Glass teeming apparatus having a table, a pair of tongs, a glass pot supported by said tongs and arranged to be moved across the table, actuating connections connected to said tongs, and means to operate the actuating connections to tilt the pot forward and backward at differential speeds by a continuous and uniform movement of the tilting means, the arrangement being such that the pot is tilted slowly while teeming and quickly reversed when the pot reaches the edge of the table; substantially as described.

10. In glass teeming apparatus, a table for receiving the molten glass, a crane transversely movable with relation to the table, a movable frame mounted on the crane, and an adjustable track for moving the frame; substantially as described.

11. Glass teeming apparatus having a table, means to support a glass pot which is arranged to be moved across the table, a continuous and uniform rotary means to tilt the pot forward and backward at differential speeds, the arrangement being such that the pot is tilted slowly while teeming and quickly reversed when the pot reaches the edge of the table; substantially as described.

12. Glass teeming apparatus having a table, means to support a glass pot which is arranged to be moved across the table, a rotary lever connected to the pot, rotary means to tilt the pot, a crank pin connected to said lever and mounted so as to rotate eccentrically to the lever, and means to rotate the crank through a complete cycle at a uniform speed to rotate the lever through a complete cycle at differential speeds, to tilt the pot slowly while moving forwardly and to return said pot quickly to its initial position when the pot reaches the edge of the table; substantially as described.

13. Glass teeming apparatus having a table, a pair of tongs, a glass pot supported by said tongs and arranged to be moved across the table, actuating connections connected to said tongs, and a continuously rotating crank connected to the actuating connections, means to tilt the pot forward and backward at differential speeds by a continuous and uniform speed of the crank, the arrangement being such that the pot is tilted slowly while teeming and quickly reversed when the pot reaches the edge of the table; substantially as described.

14. In glass teeming apparatus, a movable carriage, a pair of tongs having jaws, and reins mounted on said carriage, a screw threaded shaft connecting the ends of the reins to open and close the jaws, a ratchet wheel on said shaft, a pawl for engaging said ratchet wheel, and a shifting weight to throw the pawl into and out of engagement with the ratchet wheel; substantially as described.

15. Glass teeming apparatus having a table, a pair of tongs, a glass pot supported by said tongs and arranged to be moved across the table, a shaft arranged to be rotated through a complete cycle at a uniform speed, and actuating connections between the tongs and the shaft to tilt the pot forward and backward at differential speeds, the arrangement being such that the pot is tilted slowly while teeming and quickly reversed when the pot reaches the edge of the table; substantially as described.

16. In glass teeming apparatus, a table for receiving the molten glass, a crane transversely movable with relation to the table, a swinging frame mounted on the crane, and a cam track arranged to swing the frame on the crane in a longitudinal direction with relation to the table; substantially as described.

17. In glass teeming apparatus, a table for receiving the molten glass, a crane transversely movable with relation to the table, a swinging frame mounted on the crane, a glass pot supported on said frame, a track for supporting said crane, a second track adjacent to the first track, and an extension from the frame engaging the second track, the second track being arranged to swing the frame on the crane during the transverse movement of the crane across the table; substantially as described.

18. In glass teeming apparatus, a table for receiving molten glass, a crane transversely movable with relation to the table, a movable frame mounted on the crane, a track arranged to move the frame on the crane, and means to adjust the track to vary the movement of the frame; substantially as described.

19. In glass teeming apparatus, a table for receiving molten glass, a crane transversely movable with relation to the table, a swinging frame mounted on the crane, a track arranged to swing the frame on the crane, and means to adjust the track to vary the swinging movement of the frame; substantially as described.

20. In glass teeming apparatus, a table for receiving molten glass, a track arranged transversely with relation to the table, a crane movable on said track, a frame mounted on the crane arranged to be actuated with relation to the crane and in a longitudinal direction with relation to the table, a cam track, and a connection between the cam track and the frame arranged to actuate the frame on the crane, substantially as described.

In testimony whereof, I have hereunto set my hand.

J. W. CRUIKSHANK.

Witnesses:
JESSE B. HELLER,
H. M. CORWIN.